(12) United States Patent
Fitterer et al.

(10) Patent No.: US 10,326,760 B2
(45) Date of Patent: Jun. 18, 2019

(54) PRIVACY CONTROLS FOR SENSITIVE DISCUSSIONS

(71) Applicant: International Business Machines Corporation, Armonk, NY (US)

(72) Inventors: Annemarie R. Fitterer, Austin, TX (US); Ashishkumar C. Ghodasara, Cary, NC (US); Jackson P. Leonard, Austin, TX (US)

(73) Assignee: International Business Machines Corproation, Armonk, NY (US)

( * ) Notice: Subject to any disclaimer, the term of this patent is extended or adjusted under 35 U.S.C. 154(b) by 258 days.

(21) Appl. No.: 15/466,257

(22) Filed: Mar. 22, 2017

(65) Prior Publication Data
US 2018/0278605 A1    Sep. 27, 2018

(51) Int. Cl.
| | | |
|---|---|---|
| *G06F 21/00* | (2013.01) | |
| *H04L 29/06* | (2006.01) | |
| *G06F 21/60* | (2013.01) | |
| *G06Q 10/10* | (2012.01) | |
| *G06F 21/32* | (2013.01) | |

(52) U.S. Cl.
CPC .......... *H04L 63/0861* (2013.01); *G06F 21/32* (2013.01); *G06F 21/604* (2013.01); *G06Q 10/109* (2013.01); *H04L 63/0876* (2013.01)

(58) Field of Classification Search
CPC . H04L 63/0861; H04L 63/0876; G06F 21/32; G06F 21/604; G06Q 10/109
See application file for complete search history.

(56) References Cited

U.S. PATENT DOCUMENTS 8,079,079 B2    12/2011  Zhang et al.
8,275,837 B1 *   9/2012  Alexander .......... G06Q 10/109
                                         709/204

(Continued)

OTHER PUBLICATIONS

Anson R. et al. "Beyond face-to-face: a field study of electronic meetings in different time and place modes", Journal of Organizational Computing and Electronic Commerce, 2004, pp. 1-33.

*Primary Examiner* — Jeffrey C Pwu
*Assistant Examiner* — William A Corum, Jr.
(74) *Attorney, Agent, or Firm* — Scully, Scott, Murphy & Presser, P.C.; Michael O'Keefe, Esq.

(57) ABSTRACT

Privacy controls may be implemented using a configurable system of risk categorization for resources, physical security, sensitivity of discussion topics, prioritization of content, and identification of intended participants, by receiving participant profiles including biometric data from a plurality of participants and meeting criteria including an attendance requirement from an initiator of a meeting, scheduling a meeting based on the participant profiles and meeting criteria, generating biometric data by a biometric sensor located at meeting spaces for any participants that attend the meeting, comparing the generated biometric data to the biometric data of the participant profiles of participants identified by the attendance requirement, determining whether the generated biometric data matches the biometric data of the participant profiles of the participants identified by the attendance requirement, and transmitting a message to a computing device of the initiator indicating an outcome of the determination and ensuring enforcement of privacy controls.

17 Claims, 7 Drawing Sheets

(56) References Cited

U.S. PATENT DOCUMENTS

| | | |
|---|---|---|
| 9,338,285 B2 | 5/2016 | Anderson et al. |
| 2007/0033091 A1 | 2/2007 | Ravikumar et al. |
| 2010/0134245 A1* | 6/2010 | Klinger .............. G07C 9/00158 340/5.82 |
| 2015/0170446 A1* | 6/2015 | Burba ................ G07C 9/00134 340/5.52 |
| 2016/0125192 A1 | 5/2016 | Stuntebeck |
| 2017/0272263 A1* | 9/2017 | Riley .................. H04L 12/1822 |
| 2017/0357917 A1* | 12/2017 | Holmes ................. G06Q 10/02 |

* cited by examiner

PRIVACY CONTROLS FOR SENSITIVE DISCUSSIONS

BACKGROUND

The present invention relates to privacy controls for meetings involving sensitive discussions.

BRIEF SUMMARY

The system, method, and computer program product described herein provide privacy controls for meetings involving sensitive discussions.

In an aspect of the present disclosure, a method implemented by at least one hardware processor is disclosed. The method includes receiving participant profiles from computing devices associated with a plurality of participants. Each participant profile including biometric data of a corresponding participant and at least one preferred meeting space for the corresponding participant. The method further includes receiving meeting criteria from a computing device associated with an initiator of a meeting. The meeting criteria may include a sensitivity level, an attendance requirement, and a scheduling threshold for the meeting. The attendance requirement may include the identification of at least one of the participants for inclusion in the meeting. The method further includes scheduling the meeting based on the received meeting criteria and participant profiles. The scheduling includes the identification of at least one meeting space for holding the meeting. The method further includes generating, using at least one biometric sensor located at the at least one meeting space associated with the scheduled meeting, biometric data for each participant that attends the scheduled meeting, comparing the generated biometric data to the biometric data of the participant profiles corresponding to the at least one of the participants identified in the attendance requirement, determining whether the generated biometric data matches the biometric data of the participant profiles corresponding to the at least one of the participants identified in the attendance requirement, and in response to determining whether the generated biometric data matches the biometric data of the participant profiles corresponding to the at least one of the participants, transmitting a message to a computing device of the initiator indicating an outcome of the determination.

In aspects of the present disclosure apparatus, systems, and computer program products in accordance with the above aspect may also be provided.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

Figure 1:
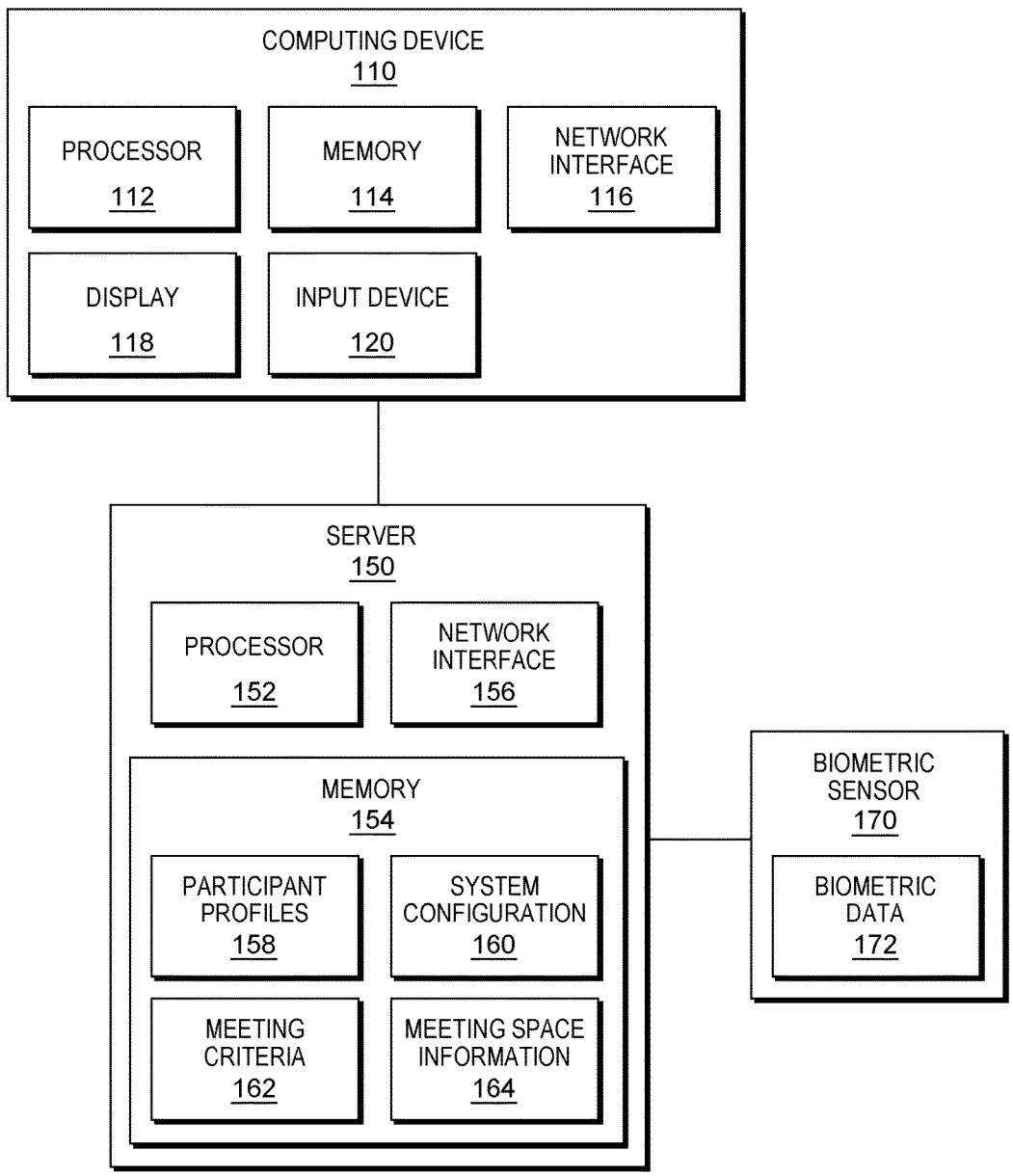
FIG. 1 is a system diagram illustrating a system for the providing privacy controls for meetings in accordance with an aspect of the present disclosure.

In today's workplace environment, teams are often geographically dispersed. For example, the members of a team may be located in a variety of different states or countries. The team members often have workspaces in an office environment, such as an office building, warehouse, workshop, production facility or other similar locations. Often such office environments include an open format that utilizes modular furniture such as cubicles or low wall desks as a way to capitalize on efficient use of space while fostering employee and team correspondence. In some cases, the workspaces of the senior team members, such as managers and team leads, may also be located in the same open format environment as the other members of their teams or other employees of the company. The open format environment, however, provides little to no privacy for conversations conducted by employees or team members, especially when sensitive information of the company is being discussed.

In some cases, the open format environment may solve this issue by including a variety of meeting spaces such as conference rooms or other similar spaces that may be "sealed off" from the open format environment to ensure privacy, for example, by closing a door. The team members may book a conference room for a certain period of time to discuss the sensitive information so that other employees located in the open format environment are not able to overhear the sensitive information.

In some aspects, when an initiator of a meeting creates the meeting invitation, the initiator, e.g., a senior team member, may manually select a local conference room. The initiator may also be provided with an option to select a conference room for use by other participants, e.g., team members, at remote sites. In some instances, the participants at a given site may have a preference for one conference room over another. For example if a topic is confidential or particularly sensitive, the initiator or participants may want to select a room that is farther away from local colleagues or a room which offers greater privacy.

In some aspects, if a remote or local conference room is not available, the initiator may be required to manually adjust the time or date of the meeting. This manual adjustment may become overwhelming to the initiator, for example, when the participants are located in a number of different remote locations and the schedules of the participants may vary.

In some aspects, the initiator may also wish to ensure that the participants of a sensitive discussion are located in a space appropriate for the discussion. For example, if a participant joins a conference using a phone at their desk in the open format environment, the risk that sensitive information may be overheard by other employees is increased. In some aspects, there may also situations where a phone call or meting does not include a discussion of sensitive information or require privacy. In this situation, the unnecessary booking of a private conference room may cause an unnecessary tie up of office resources that would otherwise be put to better use by other employees or teams that actually require privacy for their discussion of sensitive information.

In some aspects, the present disclosure provides privacy controls for meetings based on a system or framework of risk categorization for both office resources and discussion topics. For example, each office resource, e.g., conference rooms, employee desks, meeting spaces, home offices, or other similar resources used for meetings, may be categorized based on specified sensitivity criteria. For example, the sensitive criteria may include, but is not limited to, physical location, physical attributes (e.g., sound deadening material, glass walls, windows, etc.), proximity to participants and their direct reports (e.g., employees that report to the participant in the company structure), and available resources (e.g., network, projector, phone, etc.).

In some aspects, based on the sensitivity and priority of the meeting topic, for example, as defined by the initiator, an office resource may be reserved at each site for the set of participants. If a required resource is unavailable at a given site or location for the selected meeting time, the system may automatically adjust the date, time, or both to accommodate the participant's schedules and reserve a meeting location that meets the sensitivity and priority of the topic.

In some aspects, each physical location, e.g., conference room, etc., may provide a mechanism for validating the identification of any participants that are present so as to ensure that there are no unexpected listeners or participants joining from unprotected locations. For example, the biometrics of each participant may be scanned to determine the identity of all attending participants. For example, the identity of the participants may be determined upon entry to the meeting space, at the beginning of the meeting, at any time during the meeting, all of the above, or at any other time. The determined identities may be compared to a list of participants that the initiator has selected for attending the meeting to ensure that only those participants that were selected by the initiator are present. In some aspects, if participants are present that do not match the identities of the selected participants, the initiator may be notified so that corrective action may be taken on the non-selected participants.

With reference now to FIG. 1, a system 100 for providing privacy controls for meetings is illustrated. In some aspects, system 100 may include a computing device 110 and a server 150.

Computing device 110 includes a processor 112, memory 114, network interface 116, display 118, input device 120, and any other features common to a computing device. In some aspects, computing device 110 may, for example, be any computing device that is configured to communicate with server 150. In some aspects, computing device 110 may include, for example, personal computers, laptops, tablets, smart devices, smart phones, smart wearable devices, smart watches, or any other similar computing device. In some aspects, each participant (including the initiator) may have their own associated computing device 110 that may be used to implement some or all of the functionality of the present disclosure. For example, system 100 may include a plurality of computing devices 110 and a server 150.

Processor 112 may include, for example, a microcontroller, Field Programmable Gate Array (FPGA), or any other processor that is configured to perform various operations. Processor 112 may be configured to execute instructions as described below. These instructions may be stored, for example, in memory 114.

Memory 114 may include, for example, non-transitory computer readable media in the form of volatile memory, such as random access memory (RAM) and/or cache memory or others. Memory 114 may include, for example, other removable/non-removable, volatile/non-volatile storage media. By way of non-limiting examples only, memory 114 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 116 is configured to transmit and receive data or information to and from a server 150 via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 110 to transmit information to or receive information from server 150.

Display 118 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 118 may include a liquid crystal display (LCD), an e-paper/e-ink display, an organic LED (OLED) display, or other similar display technologies. In some aspects, display 118 may be touch-sensitive and may also function as an input device 120.

Input device 120 may include, for example, a keyboard, a mouse, a touch-sensitive display, a keypad, a microphone, or other similar input devices or any other input devices that may be used alone or together to provide a user with the capability to interact with computing device 110.

Server 150 includes a processor 152, memory 154, and a network interface 156 that may include similar functionality as processor 112, memory 114, and network interface 116. In some aspects, server 150 may, for example, be any computing device, server, database, or other computing system that is configured to store or manage data associated with meetings including, but not limited to, for example, participant profiles 158, system configuration 160, meeting criteria 162, and meeting space information 164. In some aspects, server 150 may be accessible by a user of a computing device 110, for example, an initiator of a meeting, to input meeting criteria 162 for setting up a meeting. In some aspects, server 150 may be configured to ensure privacy for sensitive discussions by scheduling meetings based on, for example, topic sensitivity, priority threshold scheduling for the communication, physical security criteria, and identity and access enforcement. In some aspects, server 150 may also store meeting data, e.g., invited participants, and biometric information for the participants that attended, etc., for later use in provide auditing capability for detecting and reporting potential security incidents.

Figure 2:
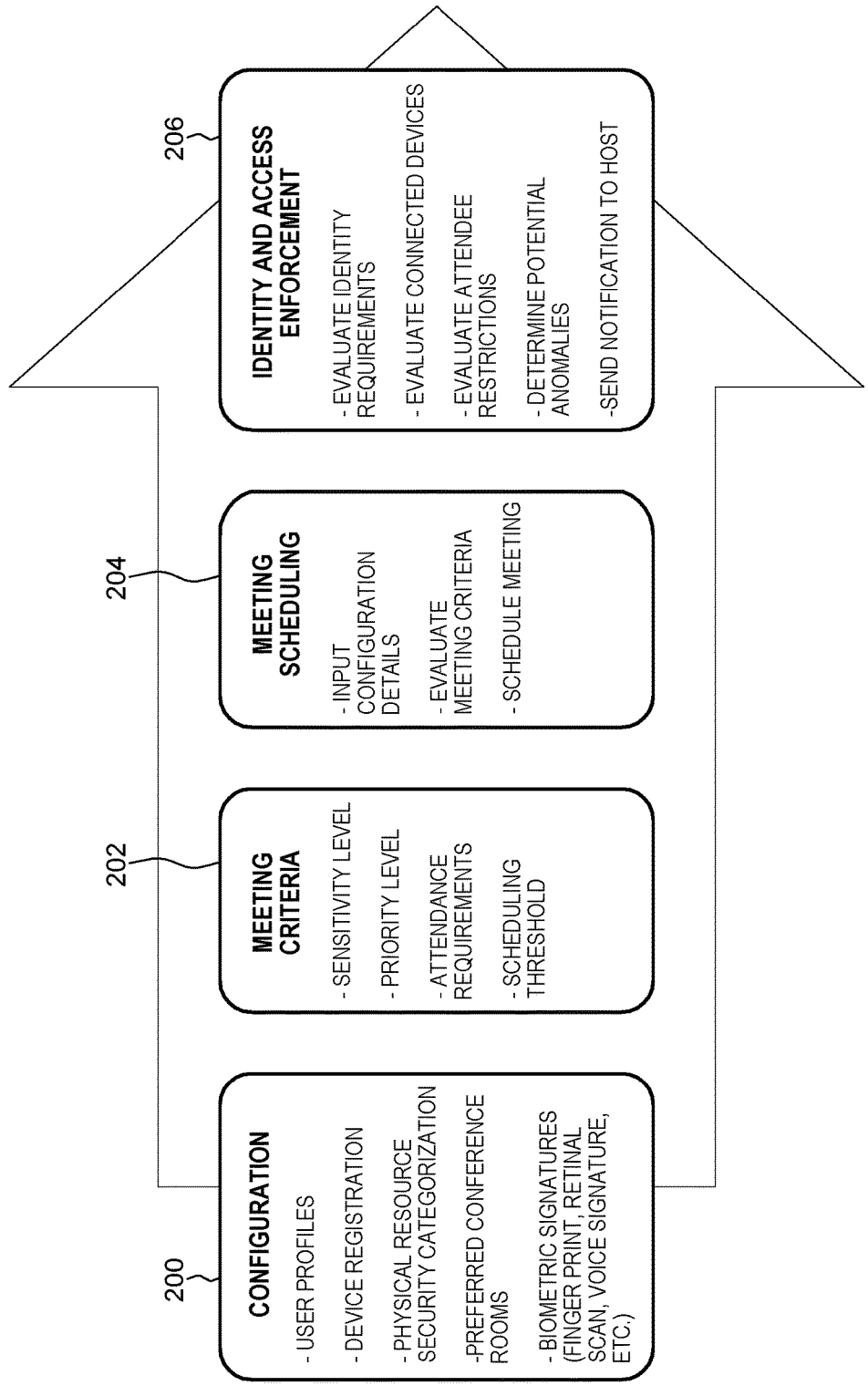
FIG. 2 is a flow chart illustrating an example flow for implementing the system of FIG. 1 according to an embodiment of the present disclosure.

With reference now to FIGS. 1 and 2, privacy controls for meetings using system 100 may be set up and enforced by establishing a system configuration 160 at 200, generating meeting criteria 162 at 202 (e.g., receiving meeting criteria 162 input by a lead participant using computing device 110), performing meeting scheduling at 204 (e.g., by server 150), and performing identity and access enforcement at 206 (e.g., at the meeting locations).

In some aspects, system configuration 160 may include, for example, user profiles for participants, registration of devices that may be involved or present at meetings, categorization of a security level of physical resources for the meetings, identification of preferred conference rooms, and the registration of biometric signatures for participants of meetings.

In some aspects, for example, each participant may provide a user profile such as a participant profile 158 to server 150 for use in scheduling meetings. For example, each participant may use a computing device 110 to access server 150 and fill out a profile via an interface, form, or other similar mechanism. In some aspects, the profile may include information such as, but not limited to, for example, the participant's reporting structure (e.g., who does the participant report to, who reports to the participant, etc.), the participant's office location, a type of the participant's office (e.g., office building, production facility, etc.), format of the participant's workspace (e.g., office with door, cubicle, open format environment, etc.), office contact information for the participant (hard line, computer, e-mail, etc.), mobile phone contact information for the participant, and network information for any devices used by the participant.

In some aspects, the participant may specify a preferred meeting location in the participant profile 158. For example, the user may specify a preferred conference room, meeting space, home office, or other remote location.

In some aspects, the participant may provide details about each meeting space or location that is available in the workplace in the participant profile 158. For example, the participant may specify in the participant profile 158 a variety of meeting locations that may be used by the participant for holding meetings, e.g., a first conference room, a second conference room, a third conference room, the participant's workspace, or any other location. In some aspects, for each location, the participant may provide additional information in the participant profile 158 that may be used to categorize a security level of the location based on a set of criteria. For example, the participant may provide additional information in the participant profile 158 including, but not limited to, a physical location of the meeting location, physical attributes of the meeting location such as audibility levels and visibility levels (e.g., the use of sound deadening material, glass walls, windows, cubicles, low wall desks, open format environment, or other physical attributes of the meeting location), a proximity of the meeting location to participant's workspace and to the workspaces of their direct reporting employees, available resources (e.g., network, projector, phone, TV, video conference capabilities, or other hardware resources), network isolation level (e.g., is the network for the meeting room isolated from the general network used by the other employees of the company or controlled and monitored in some way) or any other criteria.

In some aspects, the some or all of the criteria for each meeting location may be set by an administrator or person other than the participant, for example, by a security specialist of the company. In some aspects, where the participant has provided additional information in the participant profile 158 for a meeting space, the additional information may also be reviewed and updated by an administrator or security specialist.

In some aspects, each participant may digitally sign the details provided in their participant profile 158. For example, the participant profile 158 may be implemented as an electronic form which the participant electrically signs and submits to the server using a computing device 110.

In some aspects, a default security level may be defined for some or all of the potential meeting locations based on the location, known physical properties, and resources in each location, proximity to the reporting structure defined in the participant profiles 158 of any participants, and as determined by security policies or guidelines of the company. For example, each meeting location may be assigned a default security level by the company that may be used for future meetings.

In some aspects, the participant profile 158 may include, for example, a reporting structure of the participant (e.g., who reports to the participant, who does the participant report to, or other relevant information about the participant's reporting structure), information about the participant's office workspace (e.g., office with a door, open format environment, shared office, proximity to other employees, or other relevant information about the participant's workspace), office and mobile phone information (e.g., network ID, sim card identifier, wireless connection information, GPS location information, phone numbers, or other information that may be used to identify the phone, identify the phone's location, or other phone related information), a list of preferred meeting locations, additional information provided by the participant for the preferred meeting locations that may be used by server 150 to characterize security levels of the meeting locations, biometric signatures for the participant that may be used to verify the participant's identity (e.g., finger prints, retinal scans, face recognition data, voice recognition data, or other similar biometric data that may be used to identify the participant), and device registration information for any devices associated with the participant such as personal computers, mobile phones, wearable devices, smart devices, or any other device that the participant may use, carry, or bring into the meeting location.

In some aspects, referring again to FIGS. 1 and 2, an initiator may create a meeting invitation including meeting criteria 162 using computing device 110. For example, the initiator may log onto server 150 using computing device 110, may access a web page associated with server 150 using computing device, may execute an application on computing device 110 such as, for example, a calendar application, that interfaces with server 150, or may create a meeting invitation in any other manner.

In some aspects, when creating the meeting invitation, the initiator may set the meeting criteria 162 for the meeting. Meeting criteria 162 may include information such as, but not limited to, a sensitivity level of the meeting contents, a priority level for the meeting which may provide limitations on a corresponding threshold of flexibility dates (e.g., an urgent priority level may limit the timeframe for scheduling a meeting to the next day, a few days from now, within a week, etc.), attendance criteria (e.g., mandatory attendance, delegation is allowed, attendance is optional, or other similar attendance criteria), and scheduling thresholds for the time frame of the meeting (e.g., a day or time before which the meeting must occur).

In some aspects, meeting criteria 162 may also include security and resource requirements for any attendance locations that may be used by the required/optional attendees. For example, depending on the sensitivity level and priority level of the meeting, a conference room/meeting space may be reserved for each participant that meets the meeting criteria 162 based on the information stored in their participant profile 158.

With continued reference to FIGS. 1 and 2, once the meeting criteria 162 has been received, system 100 or server 150 may schedule the meeting based on the input system configuration 162 and meeting criteria 164. For example, system 100 may utilize the configuration details 200 and meeting criteria 202 to determine the requirements for the meeting including scheduling dates/times, participants, preferred meeting locations, required resources (e.g., video conferencing, etc.) and other configuration and criteria. If suitable meeting spaces that match the configuration details 200 and meeting criteria 202 are available for each participant, or at least each required participant, the meeting may be scheduled and the meeting spaces and required resources for each participant may be reserved.

In some aspects, if a meeting space or resource that meets the meeting criteria 202 is unavailable within the scheduling threshold, the required participant's calendar and location resource information may be checked by server 150 to automatically identify an alternate date and time that matches the meeting criteria. In some aspects, if the meeting space that meets the meeting criteria 202 is not available within the scheduling threshold, for example, does not meet the required sensitivity level and priority level, a lower prior level or sensitivity level may be utilized to find a meeting space that meets the scheduling threshold.

In some aspects, if the priority level of the meeting is high and cannot be delayed, the system 100 may evaluate other reservations for the meeting spaces which meet the meeting criteria 202 to determine if there are any lower priority meetings that may be rescheduled to an alternate location, time, or date. If such a lower priority meeting is identified, the higher priority meeting may take precedence and assume the reservation for that time and meeting space. In this case, a notification may be sent to the previous reservation holder informing the previous reservation holder that the lower priority meeting is rescheduled. In some aspects, if there are no lower priority reservations or available dates within the scheduling threshold, the participant may be requested to join from an alternate location or may be only allowed to join the conference in listen only mode. For example, the participant may be required to listen to the meeting using an "ears only" system such as headphones or by holding the participant's phone up to his or her ear. For example, the speaker phone setting on the user's phone may be disabled to prevent other employees from listening to the meeting.

With continued reference now to FIG. 2, with the meeting scheduled and the meeting spaces reserved, each participant may arrive at the corresponding meeting spaces at the designated time. When each participant arrives, identity and access enforcement 206 may be employed to ensure that only those participants that are invited to the meeting are present. For example, server 150 may evaluate identity requirements, evaluate connected devices, evaluate attendee restrictions, determine potential anomalies, and send an anomaly message to a computing device 110 of the initiator of the meeting if any anomalies are detected. For example, server 150 may evaluate the identity of a participant using the biometric data found in the participant's participant profile 158. In some aspects, for example, one or more biometric sensors 170 (FIG. 1) may be employed at the meeting spaces to sense each participant's biometric information and generate biometric data from the sensed information. Biometric sensors 170 may include, for example, digital finger print readers, retinal scanners, microphone, video cameras, body scanners, infrared or heat sensors, or any other biometric sensor 170 that may be used to gather biometric data 172 or other data about a participant for comparison to the biometric information found in the participant profile 158. The generated biometric data 172 may be transmitted to server 150 and compared to the biometric information found in the participant profile 158 to confirm the participant's identity.

In some aspects, for example, biometric sensor 170 may be a digital fingerprint reader and the participant may scan a fingerprint to generate biometric data 172. In some aspects, for example, biometric sensor 170 may be a retinal scanner and the participant may scan one or both eyes to generate biometric data 172. In some aspects, for example, biometric sensor 170 may be an infrared sensor that is configured to generate biometric data 172 providing information about a number of participants present in the room. The infrared biometric data 172 may image processed to determine how many heat sources corresponding to participants are present and the number of heat sources may be compared to the expected number of participants for the meeting space. If more heat sources are detected than expected, an anomaly message may be transmitted to computing device 110 of initiator informing the initiator that there may be additional unauthorized participants at that meeting space.

In some aspects, the generated biometric data for a participant may not match the biometric information stored in the participant profiles of each of the invited participants. In this case, a message may be transmitted to a computing device 110 of the initiator, e.g., a mobile phone, computer in the meeting room, the initiator's personal computer, or any other computing device 110, with an indication that an anomaly has been detected for the meeting. The message may include an identification of the location of the anomaly (e.g., which meeting space), an indication of the type of anomaly, e.g., failed biometric match, and an identification of the participant attempting to join the meeting without an invite if such identification may be made, e.g., by comparing the biometric data to the biometric data found in the participant profiles 158 of other employees that work at the office space where the meeting space is located. The initiator may then decide how to handle the anomaly, for example, by halting the meeting, requesting that the unauthorized participant leave the meeting space, requesting confirmation from other participants that an unauthorized participant is present, adding the unauthorized participant to the invite list, or any other method of handling the anomaly.

In some aspects, the identity of the participants may be confirmed at the start of the meeting, for example, upon entry into the meeting spaces. In some aspects, the identity of the participants may be continuously monitored or updated as the meeting progresses to determine if any new participants have entered the meeting space or if any participants have left the meeting spaces. For example, biometric sensors 170 may continuously monitor the identities of participants locate within the meeting space throughout the meeting. This may allow the initiator to receive anomaly messages if, for example, an unauthorized participant joined the meeting late. This may allow the initiator to halt or pause the meeting while the anomaly is being dealt with so that sensitive information is not inadvertently leaked.

In some aspects, the identity of an authorized participant may be confirmed by server 150 but the location or manner of accessing the meeting by the authorized participant may not match the scheduled meeting space or manner of access. For example, the authorized participant may not be located at a meeting space that meets the required sensitivity level of the meeting criteria 162 (e.g., the authorized participant may be located in an open format environment instead of at the preferred meeting space). In this case, an anomaly message may be transmitted to the computing device 110 of the initiator indicating that an authorized participant is attempting to join the meeting from an unauthorized location.

In another example, the participant may be attempting to join the meeting using an unauthorized phone number, attempting to connect to a web session of the meeting using an unauthorized IP address, or other similar situations. In these situations, for example, an anomaly message may be sent by server 150 to the computing device 110 of the initiator of the meeting indicating the nature of the unauthorized access and providing the initiator with options for how to deal with the unauthorized access. For example, server 150 may provide the initiator with the option to allow the unauthorized access as an exception, grant or deny the access, report the anomaly to local security at the office location where the anomaly is occurring, or other similar options. In some aspects, a default decision may be configured by the initiator or another user of system 100, for example, based on the company's specific security policies. For example, the default decision may automatically deny access to the meeting for any anomalies or may perform any other action in response to the detection of an anomaly.

In some aspects, for example, server 150 may provide the initiator with the option to initiate a listen only protocol for that participant in response to the anomaly message. For example, server 150 may disable speaker phone and require that the user use headphones or hold the phone to his or her ear during the meeting and may inhibit the participant's capability to provide verbal feedback to the meeting, for example, by disabling the microphone in the participant's phone. In some aspects, server 150 may also or alternatively provide the initiator with the option to contact the participant or send a message to the participant indicating a request that the participant relocate to an approved meeting space that complies with the sensitivity level requirements of the meeting.

In some aspects, in addition to biometrics, server 150 may also monitor device locations and monitor all devices which are located within the meeting space. For example, server 150 may track the movement of all devices that enter the meeting space including, for example, mobile devices, smart devices, laptops, cameras, or any other device. This monitoring may be performed in a number of different ways including, for example, the detection of devices based on GPS coordinates, geofencing, the visual identification of devices using image processing on video data from a video camera, Network Location Awareness (NLA), or other similar methods. In some aspects, for example, each device that enters the meeting space may be cataloged and cross-checked against devices found in the participant profiles 158 associated with the authorized participants of the meeting. If a device is identified that is not identified in a participant profile 158 of an authorized participant, an anomaly message may be transmitted to the computing device 110 of the initiator indicating that an unauthorized device is present. In some aspects, the anomaly message may include a location of the unauthorized device, GPS coordinates of the unauthorized device if available, an identity of the unauthorized device, an owner of the unauthorized device (e.g., identified by reference to participant profiles of other employees of the company), or other similar information. For example, if the unauthorized device is registered to another employee in the employee's participant profile 158, server 150 may provide the computing device 110 of the initiator with the identity of the employee as part of the anomaly message.

In some aspects, system 100 may store participant profiles 158 for individuals external to the company including, for example, clients, vendors, partners, etc. For example, the external individuals may register their participant profiles 158 with server 150 as described above including an additional field that indicates the relationship of the external individual to the company. The external individual may also register devices for providing scheduling, location security, identity, access, and auditing management. In some aspects, the company may provide the external individual or company with all of the devices necessary to verify the external individual's identity and to ensure that unauthorized participants are not present for the meeting at the external individual's preferred meeting space.

Figure 3:
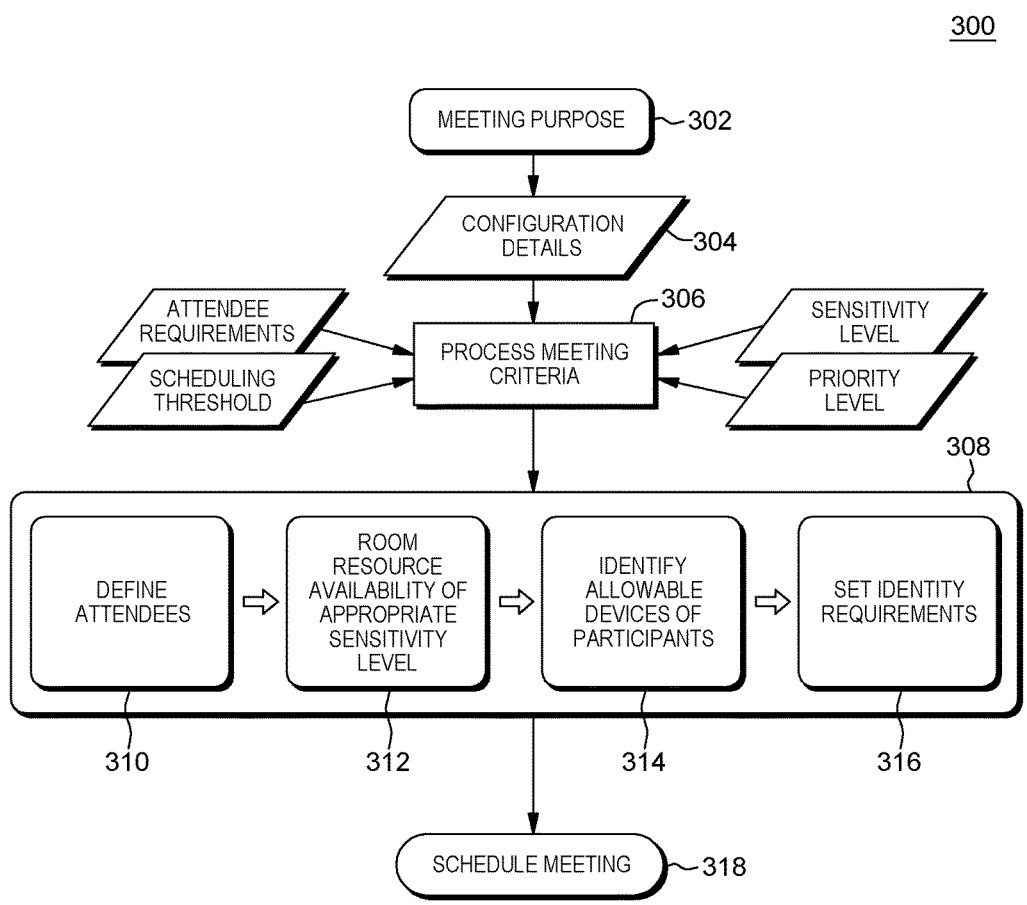
FIG. 3 is a flow chart illustrating a method for scheduling a meeting according to an embodiment of the present disclosure.

With reference now to FIG. 3, a process diagram for scheduling a meeting is illustrated. At 302, the initiator sets a purpose for the meeting, for example, using computing device 110. For example, the initiator may access a meeting API associated with the computing device 110 or server 150 that is used for setting up meetings and may enter the meeting purpose. In some aspects, for example, the initiator may fill out a field corresponding to the meeting purpose.

At 304, configuration details are entered into system 150 or are gathered by system 150. For example, participants may fill out participant profiles 158, meeting spaces may receive sensitivity designations, or other similar configuration details may be entered as described above. If details are already present for any participants or meeting spaces, server 150 may obtain or receive those details from memory 154.

At 306, meeting criteria 162 is received from the initiator as described above and processed by system 150. For example, the initiator may submit attendee requirements, scheduling thresholds, the sensitivity level and the priority level for the meeting.

At 308, system 150 determines meeting requirements based on the received meeting purpose, configuration details, and processed meeting criteria. For example, system 150 may define the attendees for the meeting at 310, determine meeting space and resource availability based on the sensitivity level, priority level, and scheduling thresholds at 312, determine which participant devices are authorized for the meeting at 314, and set the biometric identification requirements at 316.

Figure 4:
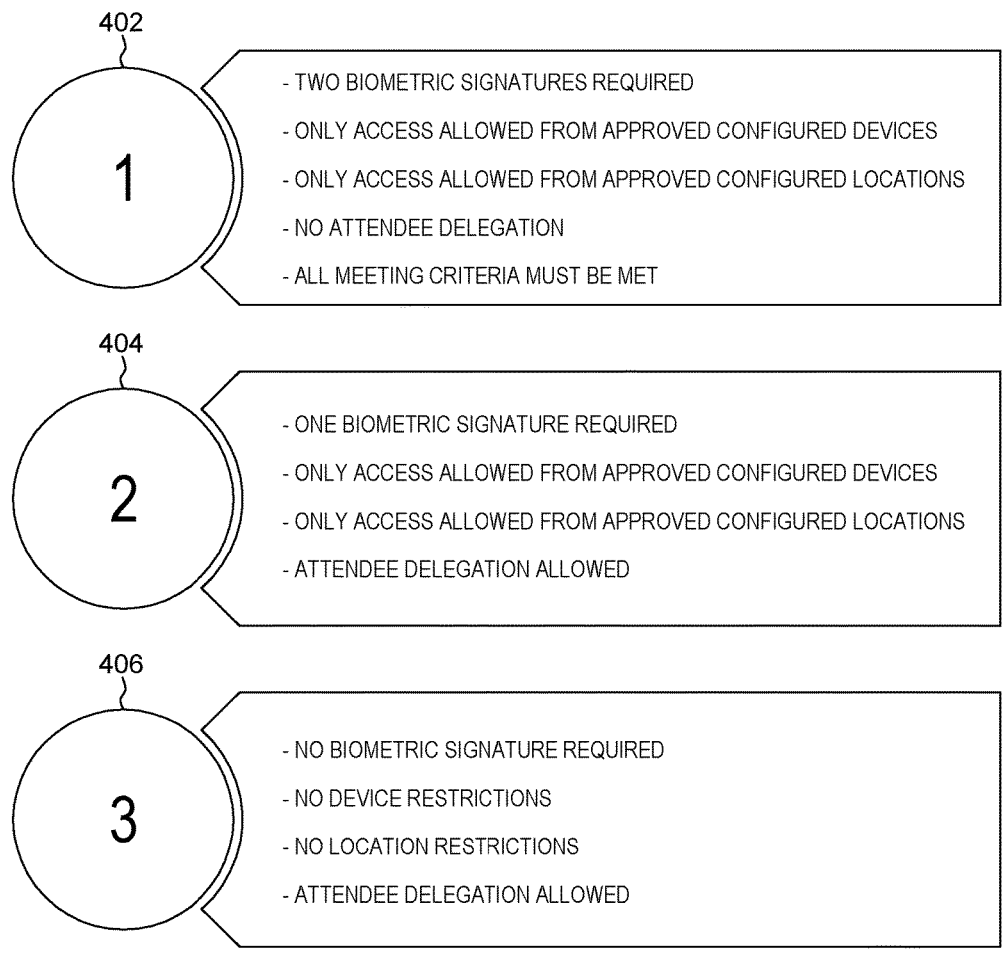
FIG. 4 is a diagram representation of example sensitivity levels that may be used according to an embodiment of the present disclosure.

In some aspects, the attendees for the meeting defined at 310 may be determined based on the attendees identified by the initiator during processing of the meeting criteria at 306. With reference to FIG. 4, for example, each sensitivity level, e.g., 1-3, identified as 402, 404, 406 respectively, may define different criteria for attendees, approved meeting locations, approved devices, and biometric requirements. For example, a meeting with a sensitivity level of 2 or 3 (404 or 406) may allow any attendee designated by the initiator to delegate the attendance requirement or request to another participant while a sensitivity level of 1 (402) may require that only the attendees designated by the initiator are allowed to attend the meeting. While example sensitivity levels 1-3 are illustrated in FIG. 4, any other number of sensitivity levels having any other set of requirements may also be implemented without departing from the scope of the present disclosure.

Referring back to FIG. 3, in some aspects, meeting space and resource availability may be determined at 312 based any or all of participant profiles 158, system configuration 160, meeting criteria 162, and meeting space information 164. For example, based on the defined attendees, server 150 may access the participant profiles 158 to determine preferred meeting spaces. In addition, sever 150 may access meeting space information 164, e.g., information about the meeting spaces that were entered into the system by participants, company security specialists, or other users of system 100 to determine the relative security level and suitability of a particular meeting space to the purpose and sensitivity of the meeting. For example, a meeting with a sensitivity level of 3 (406) may have no restrictions on meeting spaces so a participant may access the meeting from any location. A meeting having a sensitivity level of 2 or 1 (404 or 402) may include additional restrictions on the security of the meeting space, e.g., no glass walls, minimum distance from location of direct reports, etc., minimum security features, etc. Once meeting spaces that meet the requirements and sensitivity level for the meeting are identified, server 150 may determine whether those meeting spaces are available for the relevant participants during the scheduling threshold set by the initiator.

In some aspects, allowable devices of the participants may be determined at 314, for example, based on the sensitivity level for the meeting identified in the meeting criteria 162 and the devices registered to the participants in their participant profile 158 or by a system administrator of the company. For example, with reference again to FIG. 4, a meeting with sensitivity level of 3 (406) may allow participants to bring any devices that they want to the meeting spaces while meetings with a sensitivity level of 2 or 1 (404 or 402) may restrict the allowable devices to only those that are registered for invited participants or to devices that meet pre-determined security criteria for each sensitivity level, for example, as set by a system administrator.

In some aspects, server 150 may also set identity requirements at 316. For example, based on the meeting criteria 162, and configuration information 160, server 150 may determine the required security measures for ensuring that only authorized participants attend and are present in the meeting. With reference again to FIG. 4, for example, the sensitivity level identified by the initiator may also be used to determine the required biometric authentication for any participants of the meeting. For example, a meeting having a sensitivity level or 3 (406) may not require any biometric authentication of participants, a meeting having a sensitivity level or 2 (404) may require one biometric signature, e.g., a finger print scan, retinal scan, face recognition, etc., and a meeting having a sensitivity level of 1 (402) may require heightened security in the form of 2 or more biometric signatures, e.g., both a finger print and retinal scan, or any other combination of biometric signatures from each participant.

Once server 150 has defined the attendees at 310, determined meeting location and resource availability at 312, identified allowable devices at 314 and set identity requirements at 316, server 150 may schedule the meeting at 318. For example, server 150 may reserve each of the meeting spaces and transmit confirmation of the meeting to each of the defined attendees.

With reference again to FIG. 4, in some aspects, a meeting with a sensitivity level of 1 may also require that all meeting criteria 162 be met. For example, in some aspects, the meeting criteria for a meeting having a sensitivity of 2 or 3 may be relaxed when suitable meeting spaces are not available. A meeting having a sensitivity 1, however, may require that all meeting criteria be met and if they can't be met the initiator may be informed by server 150 that suitable resources or meeting spaces are not available to meet the initiators meeting criteria 162.

Figure 5:
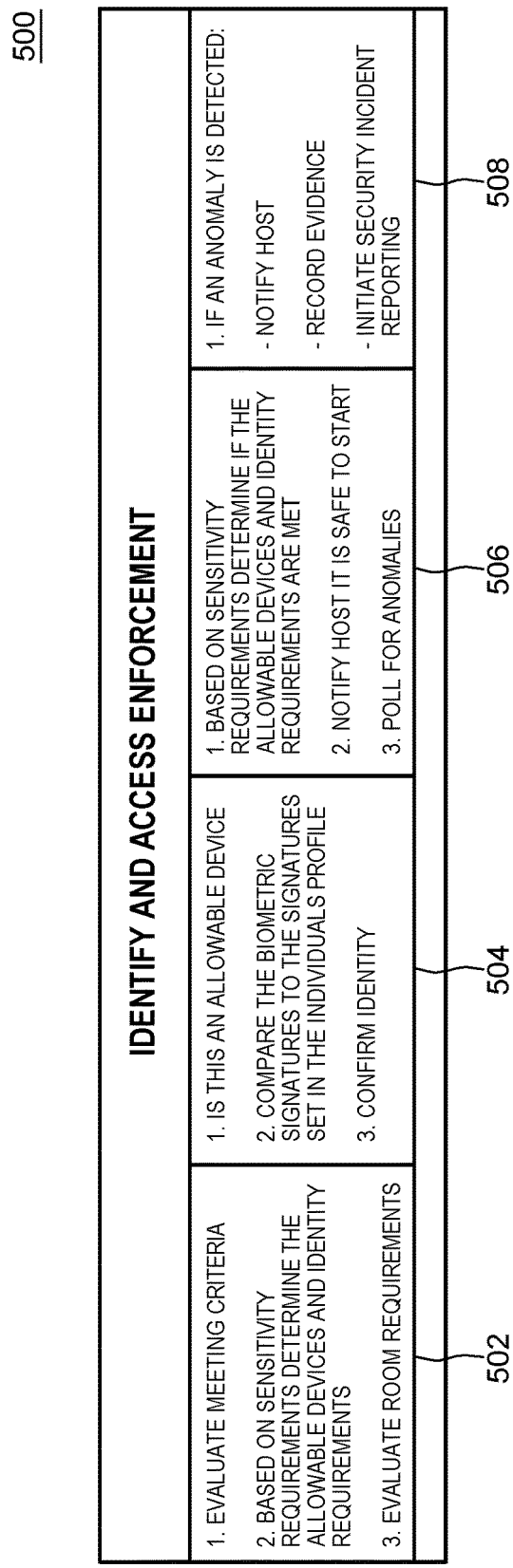
FIG. 5 is a process diagram illustrating a process for identity and access enforcement according to an embodiment of the present disclosure.

With reference now to FIG. 5, a process 500 for identity and access enforcement is illustrated. During process 500, server 150 may evaluate meeting criteria, make determinations based on sensitivity requirements regard allowable devices and identity requirements, and evaluate room (e.g. meeting space) requirements at 502, for example, in the manner described above.

In some aspects, for example, server 150 may determine whether a particular device is an allowable device, compare the biometric signatures of a participant to biometric signatures saved in the participant's profile 158, and confirm the participant's identity at 504.

In some aspects, for example, server 150 may determine whether device and identity requirements are met based on the sensitivity level set by the initiator for the meeting and may notify the initiator that it is safe to start the meeting if all device and participant identity requirements are met at 506, e.g., by transmitting a message to the computing device 110 of the initiator. Server 150 may also continue polling for anomalies during the course of the meeting to ensure the integrity of the meeting has not been breached by an unauthorized device or participant.

At 508, if an anomaly, e.g., an unauthorized device or participant, is detected either before or during the meeting, server 150 may notify the initiator of the anomaly, e.g., by transmitting a message to the initiate via computing device 110. In some aspects, for example, server 150 may store a record of the anomaly in memory 154. In some aspects, server 150 may initiate security incident reporting when an anomaly is detected to ensure that security resources are notified of the anomaly and the potential breach in security. For example, server 150 may transmit an incident report to security services at the location where the anomaly was detected.

Figure 6:
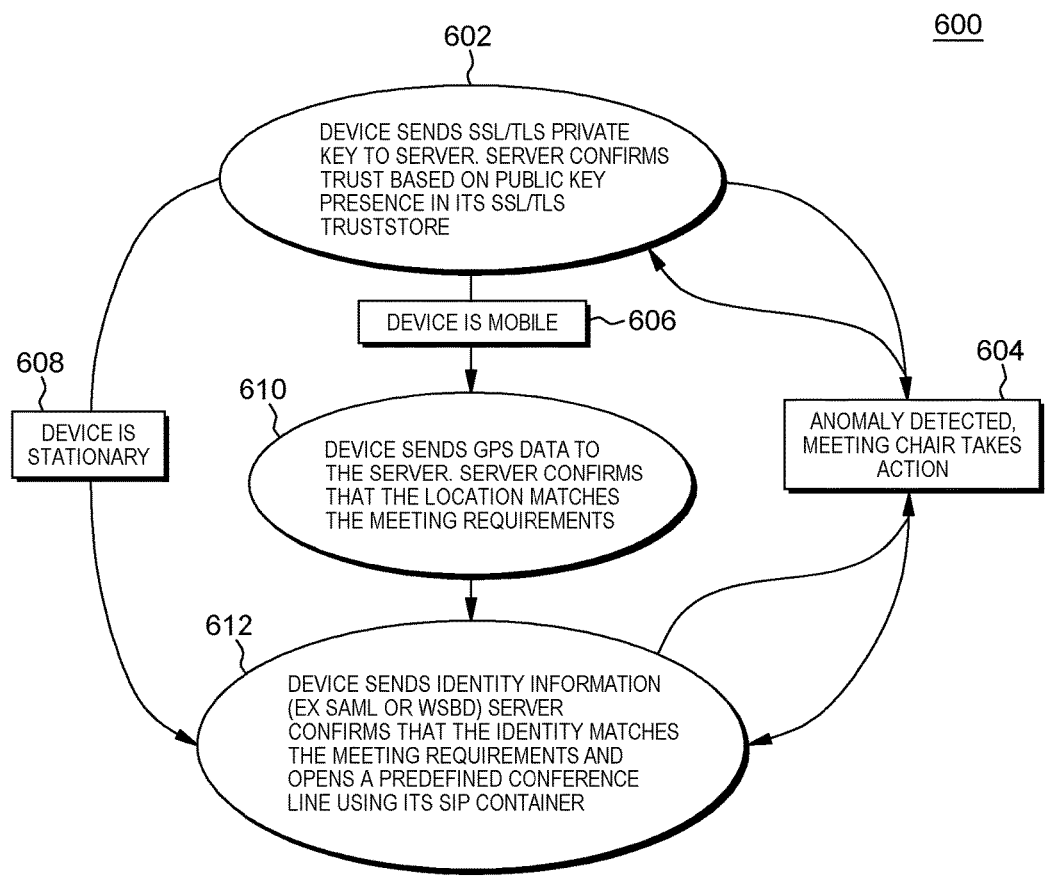
FIG. 6 is a flow chart illustrating a method for detecting an anomaly due to an unauthorized device in a meeting space according to an embodiment of the present disclosure.

With reference now to FIG. 6, a method 600 for verifying that a device is authorized for a meeting is illustrated.

At 602, a device, such as a computing device 110 of a participant, sends a Secure Sockets Layer (SSL)/Transport Layer Security (TLS) private key to server 150. Server 150 compares the private key to a trusted public key for a known device of the participant stored, for example, in a SSL/TLS trustStore (e.g., a known certificate storage system in Java). If the private key is not authenticated by the public key, an anomaly has been detected and a message is transmitted to the meeting chair (e.g., initiator) at 604. The meeting chair may then take action to authorize or deny the device access to the meeting.

If the private key is authenticated by the public key, server 150 determines whether the device is mobile at 606 or stationary at 608.

If the device is mobile, server requests GPS data for the device and the device sends the GPS data to the server at 610. The server confirms whether the location of the device matches the meeting requirements. If the location does not match, an anomaly has been detected and a message may be transmitted to the meeting chair at 604. The meeting chair may then take action to authorize or deny the device access to the meeting.

If the device is stationary or the mobile device location matches the meeting location, the device sends identity information to the server, for example, using Security Assertion markup Language (SAML) or WS-Biometric Devices (WS-BD), and the server confirms whether the identity matches the meeting requirements at 612. If the identity matches, server 150 may open a predefined conference line for the device.

Figure 7:
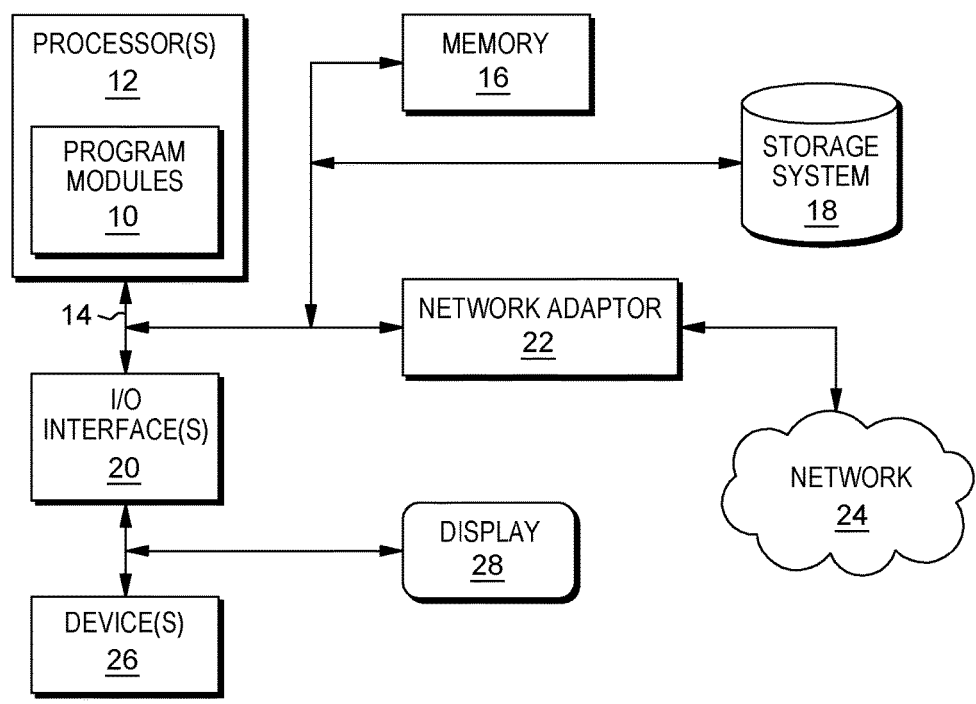
FIG. 7 is an exemplary block diagram of a computer system in which processes involved in the system, method, and computer program product described herein may be implemented.

FIG. 7 illustrates a schematic of an example computer or processing system that may implement any portion of computing device 110, server 150, biometric sensor 170, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor comprising: receiving participant profiles from computing devices associated with a plurality of participants, each participant profile comprising biometric data of a corresponding participant and at least one preferred meeting space for the corresponding participant; receiving meeting criteria from a computing device associated with an initiator of a meeting, the meeting criteria comprising a sensitivity level, an attendance requirement, and a scheduling threshold for the meeting, the attendance requirement comprising the identification of at least one of the participants for inclusion in the meeting; scheduling the meeting based on the received meeting criteria and participant profiles, the scheduling comprising the identification of at least one meeting space for holding the meeting; generating, using at least one biometric sensor located at the at least one meeting space associated with the scheduled meeting, biometric data for each participant that attends the scheduled meeting; comparing the generated biometric data to the biometric data of the participant profiles corresponding to the at least one of the participants identified in the attendance requirement; determining whether the generated biometric data matches the biometric data of the participant profiles corresponding to the at least one of the participants identified in the attendance requirement; and in response to determining whether the generated biometric data matches the biometric data of the participant profiles corresponding to the at least one of the participants, transmitting a message for receipt by the initiator indicating an outcome of the determination; wherein determining whether the generated biometric data matches the biometric data of the participant profiles corresponding to the at least one of the participants identified in the attendance requirement comprises determining that the generated biometric data for at least one of the participants that attends the scheduled meeting does not match the biometric data of the participant profiles corresponding to the at least one of the participants identified in the attendance requirement, and wherein the message indicating the outcome of the determination comprises an indication that an anomaly has been detected for the scheduled meeting.

2. The method of claim 1,
wherein determining whether the generated biometric data matches the biometric data of the participant profiles corresponding to the at least one of the participants identified in the attendance requirement comprises determining that generated biometric data for each participant that attends the scheduled meeting matches the biometric data of the participant profiles corresponding to the at least one of the participants identified in the attendance requirement, and
wherein the message indicating the outcome of the determination comprises an indication that each participant that attends the scheduled meeting has been validated for the meeting.

3. The method of claim 1, wherein the sensitivity level is selected from a plurality of sensitivity levels, each sensitivity level comprising requirements that must be met to comply with the sensitivity level.

4. The method of claim 3, wherein a first of the sensitivity levels comprises a requirement that two different kinds of biometric data must be matched to the biometric data of the participant profile of the at least one of the participants.

5. The method of claim 1, wherein the received participant profiles further comprise device registration data for computing devices associated with the plurality of participants.

6. The method of claim 5, further comprising:
detecting the presence of a computing device within the at least one meeting space for holding the meeting;
comparing the detected computing device to the device registration data of the participant profiles corresponding to the at least one of the participants identified in the attendance requirement;
determining that the detected computing device does not match any of the device registration data of the participant profiles corresponding to the at least one of the participants identified in the attendance requirement; and
in response to determining that the detected computing device does not match any of the device registration data of the participant profiles corresponding to the at least one of the participants identified in the attendance requirement, transmitting a message to a computing device of the initiator indicating that an anomaly has been detected for the scheduled meeting.

7. A system comprising: a server comprising memory and at least one hardware processor configured to: receive participant profiles from computing devices associated with a plurality of participants and store the participant profiles in the memory, each participant profile comprising biometric data of a corresponding participant and at least one preferred meeting space for the corresponding participant; receive meeting criteria from a computing device associated with an initiator of a meeting and store the meeting criteria in the memory, the meeting criteria comprising a sensitivity level, an attendance requirement, and a scheduling threshold for the meeting, the attendance requirement comprising the identification of at least one of the participants for inclusion in the meeting; and schedule the meeting based on the received meeting criteria and participant profiles, the scheduling comprising the identification of at least one meeting space for holding the meeting; at least one biometric sensor located at the at least one meeting place, the at least one biometric sensor configured to generate biometric data for each participant that attends the scheduled meeting and transmit the generated biometric data to the server; the server further configured to: receive the generated biometric data from the at least one biometric sensor; compare the received generated biometric data to the biometric data of the participant profiles corresponding to the at least one of the participants identified in the attendance requirement; determine whether the generated biometric data matches the biometric data of the participant profiles corresponding to the at least one of the participants identified in the attendance requirement; and in response to determining whether the generated biometric data matches the biometric data of the participant profiles corresponding to the at least one of the participants, transmit a message to a computing device of the initiator indicating an outcome of the determination; wherein determining whether the generated biometric data matches the biometric data of the participant profiles corresponding to the at least one of the participants identified in the attendance requirement comprises determining that the generated biometric data for at least one of the participants that attends the scheduled meeting does not match the biometric data of the participant profiles corresponding to the at least one of the participants identified in the attendance requirement; and wherein the message indicating the outcome of the determination comprises an indication that an anomaly has been detected for the scheduled meeting.

8. The system of claim 7,
wherein determining whether the generated biometric data matches the biometric data of the participant profiles corresponding to the at least one of the participants identified in the attendance requirement comprises determining that generated biometric data for each participant that attends the scheduled meeting matches the biometric data of the participant profiles corresponding to the at least one of the participants identified in the attendance requirement; and
wherein the message indicating the outcome of the determination comprises an indication that each participant that attends the scheduled meeting has been validated for the meeting.

9. The system of claim 7, wherein the sensitivity level is selected from a plurality of sensitivity levels, each sensitivity level comprising requirements that must be met to comply with the sensitivity level.

10. The system of claim 9, wherein a first of the sensitivity levels comprises a requirement that two different kinds of biometric data must be matched to the biometric data of the participant profile of the at least one of the participants.

11. The system of claim 7, wherein the received participant profiles further comprise device registration data for computing devices associated with the plurality of participants.

12. The system of claim 11, the at least one hardware processor of the server further configured to:
detect the presence of a computing device within the at least one meeting space for holding the meeting;
compare the detected computing device to the device registration data of the participant profiles corresponding to the at least one of the participants identified in the attendance requirement;
determine that the detected computing device does not match any of the device registration data of the participant profiles corresponding to the at least one of the participants identified in the attendance requirement; and
in response to determining that the detected computing device does not match any of the device registration data of the participant profiles corresponding to the at least one of the participants identified in the attendance requirement, transmit a message to a computing device of the initiator indicating that an anomaly has been detected for the scheduled meeting.

13. A non-transitory computer readable medium comprising instructions that, when executed by at least one hardware processor, configure the at least one hardware processor to: receive participant profiles from computing devices associated with a plurality of participants, each participant profile comprising biometric data of a corresponding participant and at least one preferred meeting space for the corresponding participant; receive meeting criteria from a computing device associated with an initiator of a meeting, the meeting criteria comprising a sensitivity level, an attendance requirement, and a scheduling threshold for the meeting, the attendance requirement comprising the identification of at least one of the participants for inclusion in the meeting; schedule the meeting based on the received meeting criteria and participant profiles, the scheduling comprising the identification of at least one meeting space for holding the meeting; receive, from at least one biometric sensor located at the at least one meeting space associated with the scheduled meeting, biometric data generated by the at least one biometric sensor for each participant that attends the scheduled meeting; compare the generated biometric data to the biometric data of the participant profiles corresponding to the at least one of the participants identified in the attendance requirement; determine whether the generated biometric data matches the biometric data of the participant profiles corresponding to the at least one of the participants identified in the attendance requirement; and in response to determining whether the generated biometric data matches the biometric data of the participant profiles corresponding to the at least one of the participants, transmit a message to a computing device of the initiator indicating an outcome of the determination; wherein determining whether the generated biometric data matches the biometric data of the participant profiles corresponding to the at least one of the participants identified in the attendance requirement comprises determining that the generated biometric data for at least one of the participants that attends the scheduled meeting does not match the biometric data of the participant profiles corresponding to the at least one of the participants identified in the attendance requirement; and wherein the message indicating the outcome of the determination comprises an indication that an anomaly has been detected for the scheduled meeting.

14. The non-transitory computer readable medium of claim 13,
wherein determining whether the generated biometric data matches the biometric data of the participant profiles corresponding to the at least one of the participants identified in the attendance requirement comprises determining that generated biometric data for each participant that attends the scheduled meeting matches the biometric data of the participant profiles corresponding to the at least one of the participants identified in the attendance requirement; and
wherein the message indicating the outcome of the determination comprises an indication that each participant that attends the scheduled meeting has been validated for the meeting.

15. The non-transitory computer readable medium of claim 13,
wherein the sensitivity level is selected from a plurality of sensitivity levels, each sensitivity level comprising requirements that must be met to comply with the sensitivity level; and
wherein a first of the sensitivity levels comprises a requirement that two different kinds of biometric data must be matched to the biometric data of the participant profile of the at least one of the participants.

16. The non-transitory computer readable medium of claim 13, wherein the received participant profiles further comprise device registration data for computing devices associated with the plurality of participants.

17. The non-transitory computer readable medium of claim 16, wherein the at least one hardware processor is further configured to:
detect the presence of a computing device within the at least one meeting space for holding the meeting;
compare the detected computing device to the device registration data of the participant profiles corresponding to the at least one of the participants identified in the attendance requirement;
determine that the detected computing device does not match any of the device registration data of the participant profiles corresponding to the at least one of the participants identified in the attendance requirement; and
in response to determining that the detected computing device does not match any of the device registration data of the participant profiles corresponding to the at least one of the participants identified in the attendance requirement, transmit a message to a computing device of the initiator indicating that an anomaly has been detected for the scheduled meeting.

* * * * *